United States Patent [19]

Takagi et al.

[11] Patent Number: 4,965,620
[45] Date of Patent: Oct. 23, 1990

[54] CAMERA

[75] Inventors: Tadao Takagi, Yokohama; Toshihiro Sato, Tokyo; Takashi Saegusa, Kawasaki, all of Japan

[73] Assignee: Nikon Corporation, Tokyo, Japan

[21] Appl. No.: 349,846

[22] Filed: May 10, 1989

[30] Foreign Application Priority Data

May 13, 1988 [JP] Japan .................................. 63-116723

[51] Int. Cl.$^5$ ............................................. G03B 15/05
[52] U.S. Cl. ..................................... 354/416; 354/416
[58] Field of Search ............... 354/414, 416, 417, 415, 354/432, 429, 431

[56] References Cited

U.S. PATENT DOCUMENTS 4,589,756  5/1986  Saegusa .................................. 354/432
4,809,030  2/1989  Takagi et al. ......................... 354/414

Primary Examiner—W. B. Perkey
Attorney, Agent, or Firm—Shapiro and Shapiro

[57] ABSTRACT

A camera is adapted so that a light emission level of a flashing apparatus is automatically corrected through the comparison of the control value with the appropriate exposure for the constant illumination (background illumination). As a result, an appropriate exposure can be given for the principal object, such as a person, even when the exposure for the constant illumination is outside the exposure control range or is intentionally decreased or increased.

11 Claims, 5 Drawing Sheets

CAMERA

BACKGROUND OF THE INVENTION

1. Field of the Invention

The present invention relates to a camera capable of daylight flash-synchronized photographing and slow flash-synchronized photographing utilizing a flashing apparatus.

2. Related Background Art

Such camera is already disclosed in U.S. Pat. No. 4,809,030 issued Feb. 28, 1989 and assigned to the assignee of the present invention. That patent discloses an apparatus adapted, in a scene in which a person is backlighted, to measure the constant lighting of the object field, to determine the shutter speed, diaphragm aperture and light control level of the flashing apparatus according to the result of said measurement, and to control the photographing operation according to a thus determined value, thereby achieving appropriate exposure both for the object person and the background scene.

However, such apparatus is associated with the following drawbacks:

(1) When the background illumination requires an appropriate exposure of BV2 for a photographic film sensitivity if ISO 100, the lens aperture has to be set at F2 if the shutter speed is set at 1/30 sec. in consideration of the possible camera vibration in the shutter-speed preferential mode.

However, if the mounted interchangeable lens has a largest aperture of F2.8 and cannot be opened to F2, the exposure is made outside the control range, and the background is under-exposed by 1 EV. Also the principal object, such as a person, is underexposed due to the decreased contribution from the constant illumination.

(2) Also in other automatic modes such as program mode or aperture preferential mode, a similar problem is encountered if the exposure is made outside the control range.

(3) Also in the manual mode, a similar problem is encountered if the exposure for the background is not appropriate.

SUMMARY OF THE INVENTION

An object of the present invention is to provide a camera constantly capable of appropriate flash-synchronized exposure even outside the exposure control range.

The above-mentioned object can be achieved, according to the present invention, by appropriate exposure discrimination means for comparing the control value with the exposure for the constant illustration (appropriate exposure). wherein the light emission of the flashing apparatus is automatically controlled according to the output of the discrimination means.

According to the present invention, the light emission level of the flashing apparatus is automatically corrected through the comparison of the control value with the appropriate exposure for the constant illumination (background illumination), so that an appropriate exposure can be given for the principal object (for example a person) even when the exposure for the constant illumination is outside the exposure control range or is intentionally decreased or increased.

BRIEF DESCRIPTION OF THE DRAWINGS

FIGS. 1 to 3 illustrate a first embodiment of the present invention, in which:

FIG. 1 is a block diagram of a camera system;

FIG. 2 is a detailed block diagram of light level correcting means 25; and

FIG. 3 is a chart showing corrected light levels of the light level correcting means 25 shown in FIG. 2;

FIGS. 4 and 5 illustrate a second embodiment of the present invention, in which:

FIG. 4 is a detailed block diagram of the light level correcting means 25, and

FIG. 5 is a chart showing corrected light levels of the light level correcting means 25 shown in FIG. 4;

DESCRIPTION OF THE PREFERRED EMBODIMENTS

Figure 6:
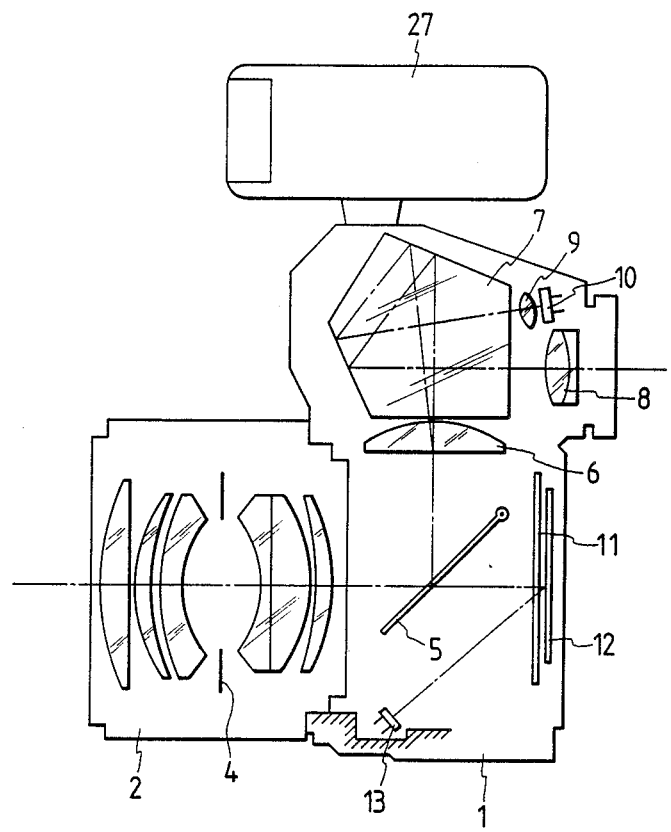
FIG. 6 is a view of a single-lens reflex camera in which the present invention is applied.

FIG. 6 illustrates a single-lens reflex camera embodying the present invention, where a photographing lens 2 and a flashing apparatus 27 are mounted on a camera body 1. A light flux (constant illumination in this case) passing through the photographing lens 2 is reflected by a mirror 5, then guided through a focusing screen 6 and a pentagonal roof prism 7 and is partly introduced to an eyepiece lens 8, while the remainder is introduced to a light metering system composed of a condenser lens 9 and a photosensor 10.

Figure 1:
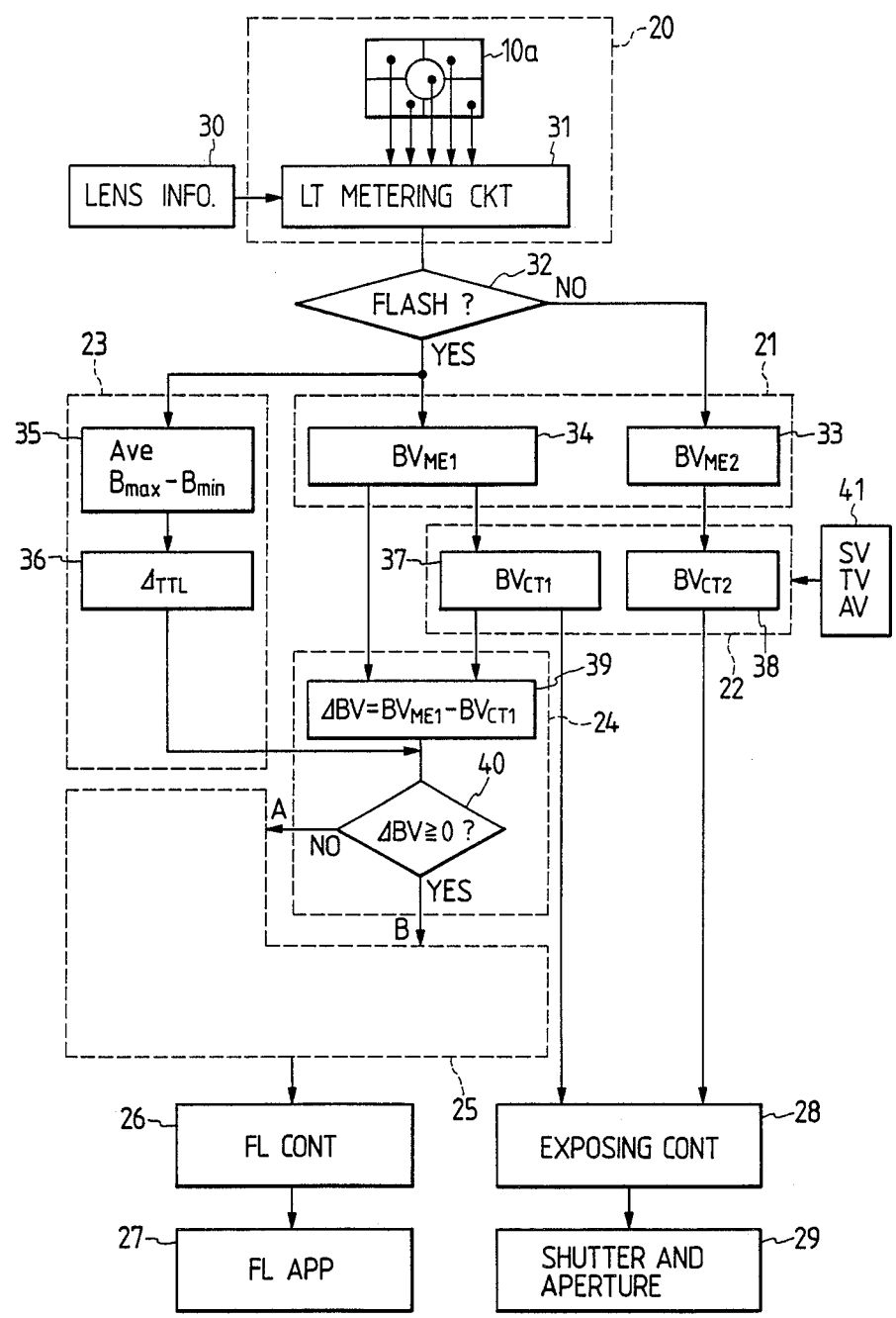

The light-receiving area 10a of said photosensor 10 is divided into 5 areas, as shown in FIG. 1, for enabling light metering in the central area and peripheral areas in the object field.

In the following there will be explained the function of the camera. In the photographing operation, the mirror 5 is lifted, and a diaphragm 4 is reduced to a predetermined aperture. Then a shutter 11 is opened to give an exposure to a photographic film 12, and the flashing apparatus 27 starts light emission. The emitted light is reflected by the principal object. The reflected light, together with the constant illumination (background light), is transmitted by the photographing lens 2 and falls on the film 12 for exposing, and a component reflected by said film 12 enters a photosensor 13 for TTL light control. The output of said photosensor 13 enters a light control circuit, which terminates the light emission from the flashing apparatus 27, upon detection that a predetermined amount of reflected light has entered the photosensor 13.

FIG. 1 is a block diagram of the system of the present invention. Light metering means 20 is composed of photosensor 10 and a light metering circuit 31, which logarithmically compresses the output (photocurrent) of said photosensor 10 and calculates the luminosity by correcting said output with lens data 30 (for example full-open F-number of the photographing lens 2) provided in said lens 2.

Flash discrimination means 32 receives a signal, indicating whether or not the flash apparatus 27 (FIG. 6) is used, from automatic or manual setting means (not shown), and sends the outputs of the light metering means 20 (luminosity values of five areas) to exposure calculating means 21 etc. to be explained in the following.

At first there will be explained the function when the flashing apparatus 27 is not in use.

The outputs of the light metering means 20 are supplied to second exposure calculating means 33 of the exposure calculating means 21, for calculating an appropriate luminance $BV_{ME2}$. This calculation can be made for example by an algorithm for 5-zone multi-pattern light metering to be explained later in relation to FIG. 7. The appropriate luminance $BV_{ME2}$ is supplied to second control value calculating means 38 of control value calculating means 22, for determining a control luminance value $BV_{CT2}$ based on the film sensitivity Sv, shutter speed Tv, diaphragm aperture Av, etc.

The appropriate luminance value $BV_{ME2}$ is determined by the outputs of the 5-divided photosensor, and indicates a luminance required for obtaining an appropriate exposure. On the other hand, the control luminance $BV_{CT2}$ is determined from the actually controllable shutter speed and diaphragm aperture and the sensitivity of the actually loaded film, and may therefore be different from the appropriate luminance $BV_{ME2}$.

For example, in a situation where the appropriate luminance $BV_{ME2}$ is obtained at the minimum aperture f22 of the lens when the shutter speed is selected at 1/60 sec. in the shutter preferential mode, the actually controlled diaphragm aperture will be f22 if the shutter speed is selected at 1/30 sec. though the appropriate aperture for obtaining the appropriate luminance $BV_{ME2}$ is f32. The luminance obtained from the actual shutter speed, diaphragm aperture and film sensitivity corresponds to the control luminance $BV_{CT2}$. The applies to the control luminance $BV_{CT1}$ to be explained later.

Then exposure control means 28 activates exposure means 29 composed of the shutter and the diaphragm according to the control luminance $BV_{CT2}$, thus completing the exposure operation.

In the following there will be explained a case of using the flashing apparatus 27.

The outputs of the light metering means 20 are supplied to exposure calculating means 21 and light level determining means 23. First exposure calculating means 34 of the exposure calculating means 21 determines the appropriate luminance $BV_{ME1}$ for example according to the algorithm described in the aforementioned patent. Since the light metering in the present embodiment is conducted in five areas, there is employed an algorithm shown in FIG. 7

Figure 7:
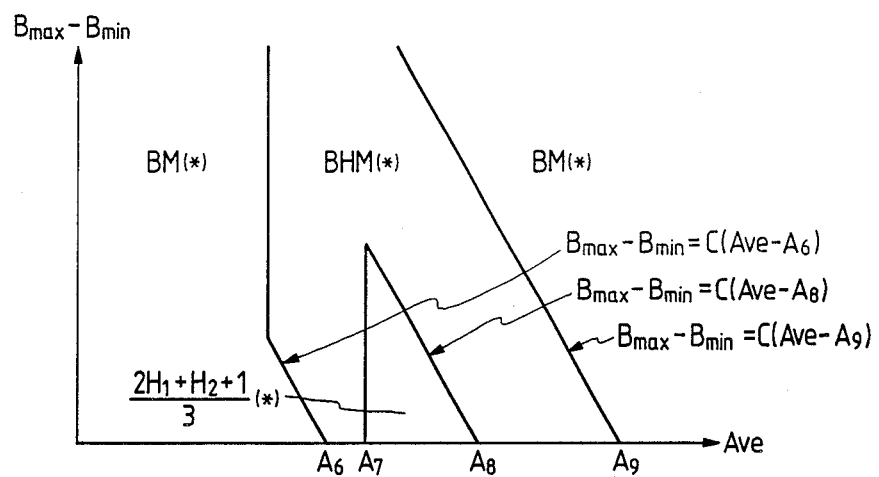
FIG. 7 is a chart showing zones for exposure determination with five zones.

FIG. 7 is a chart for determining the exposure, indicating the maximum luminance difference (maximum luminance $B_{max}$ — minimum luminance $B_{min}$) in the ordinate as a function of the average luminance $A_{ve}$ in the abscissa, and the entire chart is divided into four zones BM(*), BHM(*), $(2H_1+H_2+1)/3$ (*) and BM(*).

In each zone, calculation is made on five luminance values obtained from five outputs of light metering, but the luminance BV is replaced by $11\frac{1}{3}$ if it exceeds $11\frac{1}{3}$, prior to the calculation.

In the following there will be explained the meaning of BM, BHM, *, $H_1$, $H_2$ etc. and boundary lines l, m, n in the chart:

$A_{ve}$ . . . average value of outputs of 5-divided photosensor;

$B_{max}$, $B_{min}$ . . . maximum and minimum values of outputs of 5-divided photosensor;

l . . . $B_{max}-B_{min}=C(A_{ve}-A_6)$;

m . . . $B_{max}-B_{min}=C(A_{ve}-A_8)$;

n . . . $B_{max}-B_{min}=C(A_{ve}-A_9)$;

BM . . . same as $A_{ve}$;

BHM . . . mean value of BM and $B_{max}$;

* . . . output is replaced by $BV11\frac{1}{3}$ if it exceeds $11\frac{1}{3}$ of BV;

$H_1$ . . . same as $B_{max}$; and $H_2$ . . . second largest value among the outputs of 5-divided photosensor;

For example $A_6=BV5$, $A_8=BV9$ and $A_9=BV11$.

The exposure is determined according to one of the four zones in the chart, to which the outputs of the 5-divided photosensor correspond. The first exposure calculating means 34 determines the appropriate luminance $BV_{ME1}$ according to the above-explained algorithm. Then the first control value calculating means 37 of control value calculating means 22 calculates the control luminance $BV_{CT1}$ according to the appropriate luminance $BV_{ME1}$.

The appropriate exposure discrimination means 24 receives the aforementioned appropriate luminance $BV_{ME1}$ and control luminance $BV_{CT1}$, and subtraction means 39 calculates the difference $\Delta BV$ $(BV_{ME1}-BV_{CT1})$ and sends it to discrimination means 40.

Light control level determining means 23 calculates the average $A_{ve}$ and the maximum luminance difference $B_{max}-B_{min}$ from five outputs of the light metering means 20, and determines from these values, the light level shift $\Delta TTL$ (amount of shift from the standard exposure), for example according to an algorithm described in the aforementioned patent. As the light metering in the present embodiment is made in five areas there is employed an algorithm as shown in FIG. 8.

Figure 8:
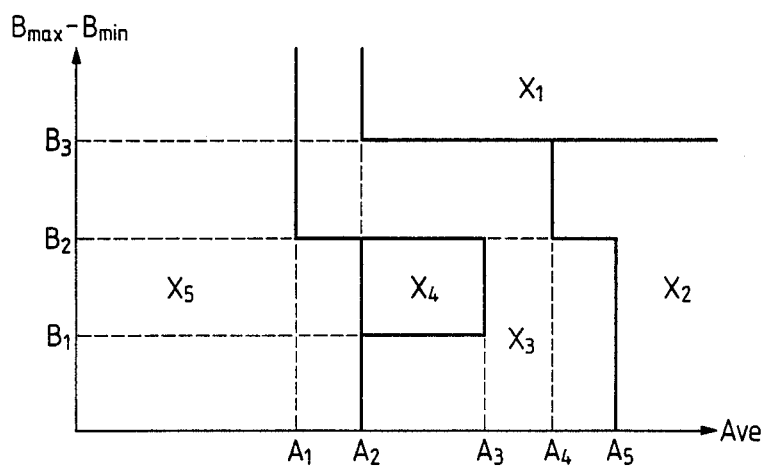
FIG. 8 is a chart showing zones for determining the amount of light emission from the flashing apparatus.

Referring to FIG. 8, the light control level is determined in five zones ($X_1-X_5$). The meaning of the chart shown in FIG. 8 is for example as follows:

$A_1$ . . . BV5

$A_2$ . . . BV6

$A_3$ . . . BV8

$A_4$ . . . BV9

$A_5$ . . . BV10

$B_1$ . . . BV1.5

$B_2$ . . . BV3

$B_3$ . . . BV4

$X_1$ . . . under-exposure by $\frac{2}{3}$ EV with respect to normal TTL light control level;

$X_2$ . . . under-exposure by 1 EV with respect to normal TTL light control level;

$X_3$ . . . under-exposure by $1\frac{1}{3}$ EV with respect to normal TTL light control level;

$X_4$ . . . under-exposure by $1\frac{2}{3}$ EV with respect to normal TTL light control level; and $X_5$ . . . under-exposure by 2 EV with respect to normal TTL light control level.

According to the above-mentioned algorithm, the light control level determining means 36 determines the light control level shift $\Delta TTL$, which is supplied to the discrimination means 40, which compares the difference of the appropriate luminance and the control luminance $(\Delta BV=BV_{ME1}-BV_{CT1})$ with zero, and a predetermined port A, B of the light control level correcting means 25 is selected according to the result of the comparison. The shift $\Delta TTL$ corrected in the correcting means 25 is supplied to light control means 26 for controlling the light emission from the flashing apparatus 27.

Figure 2:
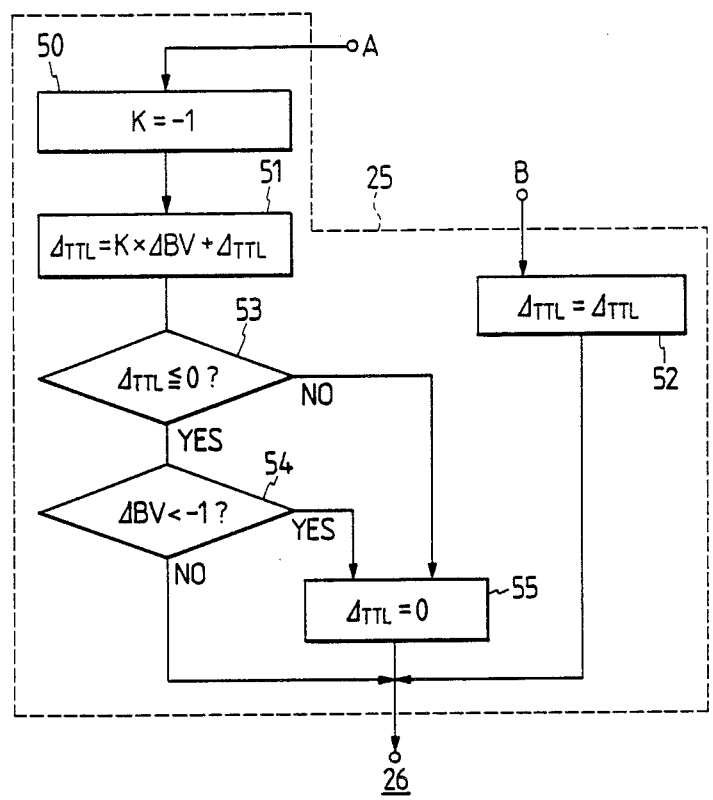
Figure 3:
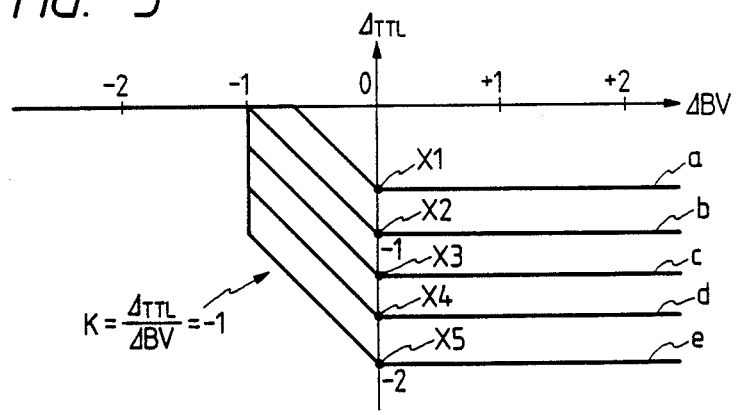

In the following there will be explained the light control level correcting means 25, with reference to FIGS. 2 and 3. FIG. 2 is a block diagram of correcting means 25, while FIG. 3 is a chart showing the correction values of the light control level by correcting means 25.

In FIG. 2, when the discrimination means 40 (FIG. 1) provides a result $\Delta BV \geq 0$ indicating that the constant illumination (background illumination) is adequately controlled, a port B is selected. Upon selection of the port B, setting means 52 sends the light control level shift $\Delta TTL$ to the light control means 26 without any correction. Thus, as shown in FIG. 3, the light control level shift $\Delta TTL$ corresponding to $\Delta BV=0$ assumes values of points $X_1-X_5$ of lines a–e, namely values corresponding to the zones $X_1-X_5$ of the algorithm shown in FIG. 8.

If in FIG. 2, the discrimination means 40 identifies a condition $\Delta BV > 0$ indicating that the constant illumination (background illumination) provides an over-exposure, the setting means 52 sends the light control level shift $\Delta TTL$ to the light control means 26 without any correction. As shown by lines a–e in FIG. 3, the shift $\Delta TTL$ corresponding to $\Delta BV < 0$ is the same as the shift $\Delta TTL$ for $\Delta BV = 0$.

If in FIG. 2, the discrimination means 40 identifies a condition $\Delta BV < 0$ indicating that the constant illumination (background illumination) provides an under-exposure, a port A is selected. Upon selection of the port A, setting means 50 selects K as $K = \Delta TTL/\Delta BV = -1$. Then the correcting means 51 corrects the light control level shift $\Delta TTL$ in the following manner. For example, for $\Delta TTL = -1\frac{1}{3}$ and $\Delta BV = -\frac{1}{2}$:

$$\Delta TTL = K \times \Delta BV + \Delta TTL$$
$$= (-1) \times (-\tfrac{1}{2}) + (-1\tfrac{1}{3})$$
$$= -5/6$$

so that the shift $\Delta TTL$ ($= -1\frac{1}{3}$) is corrected as $-5/6$. Since the corrected shift $\Delta TTL$ is ($-5/6 < 0$) is negative, and since $\Delta BV = -\frac{1}{2} > -1$, the corrected shift ($= -5/6$) is transmitted by the first discrimination means 53 and the second discrimination means 54 and supplied to the light control means 26. When the shift $\Delta TTL$ is negative and when $0 \geq \Delta BV \geq -1$, the shift $\Delta TTL$ corrected according to the above-explained equation ($\Delta TTL = K \times \Delta BV + \Delta TTL$) is supplied to the light control means 26.

Referring to FIG. 2, if the corrected light control level shift $\Delta TTL$ determined by the correcting means 51 exceeds zero, or if $\Delta BV$ is smaller than $-1$, the setting means 55 sets the shift $\Delta TTL$ at zero and sends it to the light control means 26.

Thus, in the use of the flashing apparatus 27, if a difference $\Delta BV$ is generated between the appropriate luminance $BV_{ME1}$ and the control luminance $BV_{CT1}$ to provide an under-exposure for the constant illumination (background illumination) and if the difference $\Delta BV$ does not exceed 1 EV, namely if within a range $0 \geq \Delta BV \geq -1$ shown in FIG. 3, the amount of light emitted from the flashing apparatus 27 is corrected to a higher side according to the above-explained equation, thereby preventing the under-exposure of the principal object.

If $\Delta BV$ for the constant illumination (background illumination) exceeds 1 EV, namely in a range $\Delta BV \leq -1$ shown in FIG. 3, the amount of light emission from the flashing apparatus 27 is corrected to the higher side to correspond to an amount of standard exposure ($\Delta TTL = 0$), thereby preventing the under-exposure for the principal object.

On the other hand, if the constant illumination (background illumination) is so controlled to provide an over-exposure, and if the amount of the over-exposure $\Delta BV$ is in excess of 0 EV, namely in case of a range $\Delta BV \geq 0$ shown in FIG. 3, the amount of light emission from the flashing apparatus 27 is controlled according to the algorithm shown in FIG. 8 thereby providing an appropriate exposure for the principal object.

In the following there will be explained a second embodiment of the present invention.

Figure 4:
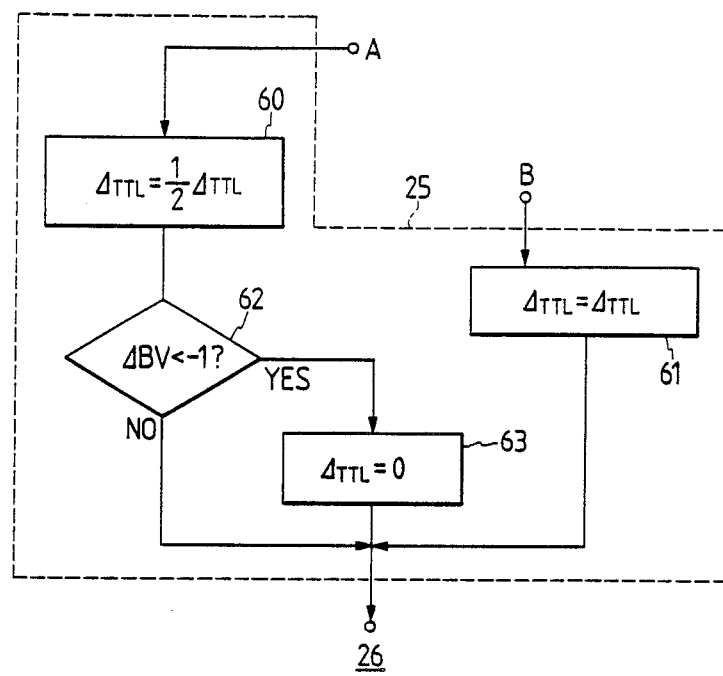
Figure 5:
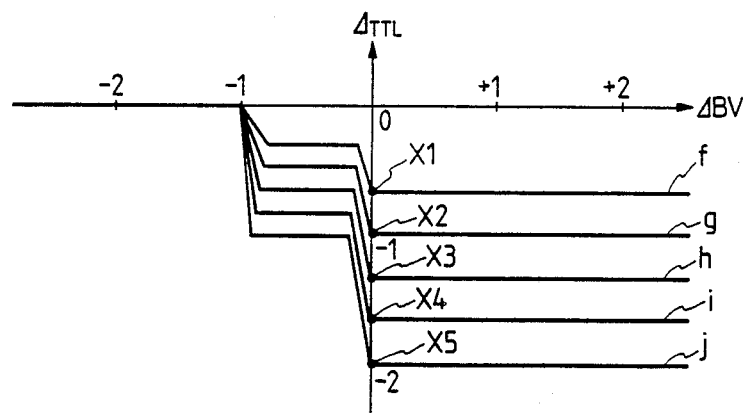

FIGS. 4 and 5 show a second embodiment of the light control level correcting means, wherein FIG. 4 is a block diagram of said correcting means 25, and FIG. 5 is a chart showing the correction values of the light control levels of correcting means 25.

If the discrimination means 40 identifies a condition $\Delta BV = 0$ or $\Delta BV > 0$ indicating that the constant illumination (background illumination) is so controlled as to provide an appropriate or over exposure, the function is the same as that in the first embodiment. More specifically, as shown in lines f–j in FIG. 5, the light control level shift $\Delta TTL$ corresponding to $\Delta BV = 0$ assumes values $X_1-X_5$, corresponding to zones $X_1-X_5$ in an algorithm shown in FIG. 8.

On the other hand, if the discrimination means 40 identifies a condition $\Delta BV < 0$ indicating that the constant illumination (background illumination) provides an under-exposure, there is selected a port A and the correcting means sets the shift $\Delta TTL$ at a level of $\frac{1}{2} \times \Delta TTL$. For example, if the light control level setting means 23 determines $\Delta TTL = -1\frac{1}{3}$ according to the algorithm shown in FIG. 8 and the subtraction means 39 determined $\Delta BV = -\frac{1}{2}$, the constant illumination discrimination means 24 selects the port A. Thus the correcting means 60 calculates $\Delta TTL$ as:

$$\Delta TTL = \Delta TTL \times \tfrac{1}{2} = (-1\tfrac{1}{3}) \times \tfrac{1}{2} = -\tfrac{2}{3}$$

Since $\Delta BV = -\frac{1}{2} \geq 1$, the value $\Delta TTL = -\frac{2}{3}$ is supplied, through the discrimination means 62, to the light control means 26. Thus, for a negative shift $\Delta TTL$ and for a condition $0 \geq BV \geq -1$, the shift corrected according to the above-mentioned equation ($\Delta TTL = \Delta TTL \times \frac{1}{2}$) is supplied to the light control means 26.

On the other hand, if the corrected shift $\Delta TTL$ determined by the correcting means 60 exceeds zero or if $\Delta BV$ is smaller than $-1$ in FIGS. 4 and 5, the setting means 63 sets the shift $\Delta TTL$ at zero and sends this value to the light control means 26.

As explained in the foregoing, the second embodiment is simpler than the first embodiment, but can still provide the same effects as in the first embodiment.

The foregoing embodiments use a flashing apparatus with TTL light level control, but the present invention is not limited to such embodiments and is likewise applicable for example to a flashing apparatus of so-called external light level control method.

What is claimed is:

1. A camera comprising:
   (a) light metering means;
   (b) appropriate luminance calculating means for calculating an appropriate luminance on the basis of the output of said light metering means and producing an appropriate luminance signal;

(c) exposure control means;

(d) control luminance calculating means for calculating a control luminance corresponding to an exposure value controlled by said exposure control means;

(e) discrimination means for comparing said appropriate luminance with said control luminance;

(f) flash light emission means for emitting flash light toward an object;

(g) determination means for determining a control level on the basis of the output of said light metering means;

(h) correction means for correcting said control level on the basis of the result of comparison by said discrimination means; and (i) flash light control means for controlling the termination of the flash emission from said flash light emission means on the basis of said corrected control level and at least a part of light from said object.

2. A camera according to claim 1, wherein said discrimination means calculates a difference between the value of said appropriate luminance and that of said control luminance.

3. A camera according to claim 2, wherein said correction means does not correct said control level when said difference is beyond a predetermined range.

4. A camera according to claim 3, wherein said flash light control means controls the termination of the flash emission from said flash light emission means on the basis of said control level and at least a part of the light from said object when said difference is beyond a predetermined range.

5. A camera according to claim 3, wherein said correction means calculates a correction value on the basis of said difference and calculates a corrected control level on the basis of said correction value.

6. A camera according to claim 5, wherein said correction means multiplies said difference by a predetermined value to calculate said correction value.

7. A camera according to claim 6, wherein said correction means adds said correction value to said control level.

8. A camera according to claim 4, wherein said correction means multiplies said control level by a predetermined value to calculate said correction value.

9. A camera according to claim 1, wherein said correction means corrects said control level when the value of said appropriate luminance is not equal to that of said control luminance.

10. A camera according to claim 1, wherein said correction means corrects said control level when the value of said appropriate luminance is smaller than that of said control luminance.

11. A camera according to claim 1, wherein said light metering means meters light intensity of each of a plurality of areas of said object and produces an output which indicates light intensity of each of said plurality of areas.

* * * * *